May 10, 1932. J. A. GAUSCHE 1,857,753
LAND PULVERIZER AND PACKER
Filed Jan. 19, 1931
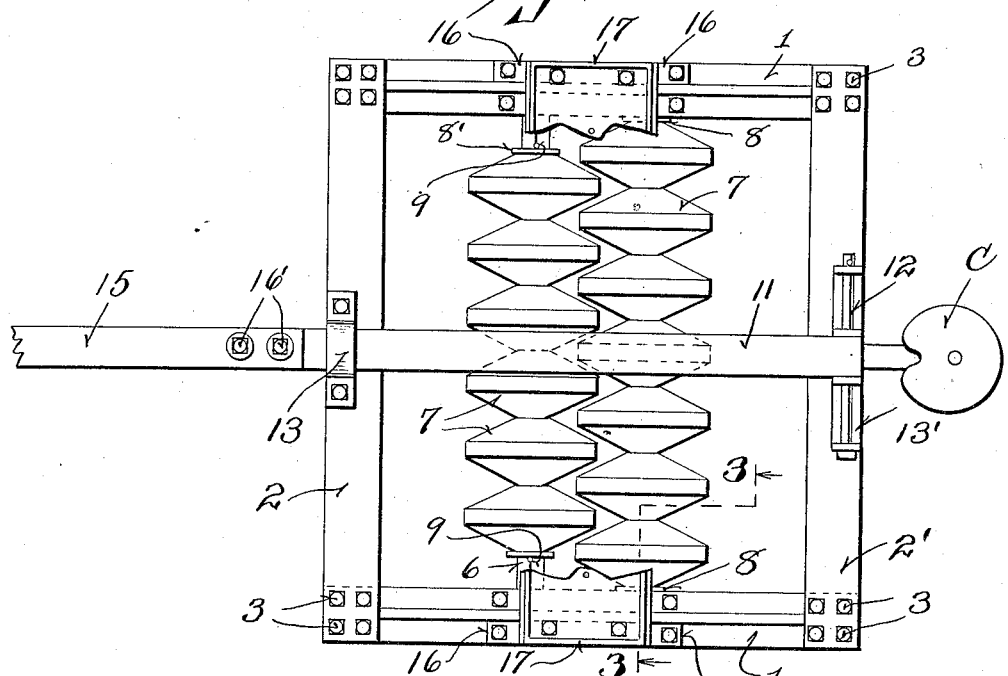

Patented May 10, 1932

1,857,753

UNITED STATES PATENT OFFICE

JULIUS A. GAUSCHE, OF RACINE, WISCONSIN

LAND PULVERIZER AND PACKER

Application filed January 19, 1931. Serial No. 509,684.

This invention refers to land pulverizers and packers, and it has for its primary object to provide an agricultural machine of this type, which is so constructed that it is capable of being shipped knock-down, and assembled by those unskilled in the art by simply manipulating a plurality of standard bolts.

Another object of my invention is to provide a light, durable hollow disc comprising complementary units having flat peripheral faces which are telescopically driven together to complete the disc.

Another object is to provide a squared shaft upon which the gangs of discs are mounted and arranged in alternate or nested rows, whereby the flat peripheral surfaces are positioned in close relationship so as to thoroughly pack the ground preventing high ridges that heretofore receive grain which will not develop, due to resting in the light high soil and resulting in the grain growing in ridges, and that grain which is at the top of the usual high points is entirely wasted, due to lack of sprouting, and this waste may conservatively be estimated at approximately one-half of the seed.

Another object of my invention is to provide a draft appliance which is pivotally connected to the rear frame structure whereby the machine is capable of forward floating, independent of the draft.

A further object is to provide a double draft appliance, whereby the machine can be conveniently coupled to a tractor or utilized as an animal draft implement.

A further object is to provide for economy in construction, wherein the parts are in duplicate or multiple throughout.

Another object of the invention is to provide a weight carrier, whereby the load or pressure of the discs may be varied in accordance with the condition of the coil.

With the above and other minor objects in view, the invention consists in certain peculiarities of construction and combination of parts as will be hereinafter set forth with reference to the accompanying drawings and subsequently claimed.

In the drawings, Figure 1 represents a plan view of an agricultural implement embodying the features of my invention;

Figure 2 is a side elevation of the same with parts broken away and other parts in section to more clearly illustrate sectional features; and Figure 3 is an enlarged detailed sectional elevation of a fragment of the frame and disc mounting elements.

Referring by characters to the drawings, 1—1 indicates longitudinal disc carrying web struts which are bowed upwardly at their ends and have secured thereto transverse webbed struts 2—2'. The two sets of struts constitute a rectangular frame having their ends secured together by groups of standard bolts 3 at the lapping corners of said struts. The longitudinal struts 1 have secured thereto closed end journal bosses 4—4' for the reception of the cylindrical ends 5 and 5' of squared shafts 6—6.

The space between the struts 1—1 is of such distance that the rear square shaft 6 is adapted to receive a sufficient number of conical hollow discs 7 to completely fill such space, there being washers 8 positioned between the base of the end discs and the journal bosses 4'. The front squared shaft has mounted thereon a series of conical discs of less number than the rear shaft, and these discs are arranged alternately with the rear gang, whereby they nest in close relation with said rear gang. Thus, the conical faces of the two gangs of discs will serve as scrapers with relation to each other. The front set of discs is held in relative position with reference to the back series by washers 8' which are held against end play in conjunction with the series of discs by water pins 9.

As best shown in Figure 3 of the drawings, the conical hollow discs are formed with squared central openings for the reception of the shaft 6 and the periphery of each conical element is merged into rectangular flanges 10—10', which flanges are in driving fit, whereby the two-part discs are securely held and when driven together form a single unit which is weather-proof with reference to its hollow interior.

Thus, it will be seen that these discs can be manufactured cheaply, and quickly assembled into complete units, and that the peripheral flat face forms a packing surface, which packing surface in conjunction with the two sets of discs will iron out the soil with only minute ridges between the flattened portions, said gangs of discs thus forming in effect a roller and the slight ridge between the rolled surfaces is of such proportions as to not form high points wherein the seed will fail to germinate.

In other words, this implement can be attached to the back of a seeder and will act as a roller and thus thoroughly perform the functions both as a pulverizer or crusher and roller.

The draft appliance comprises a draft bar 11, which is pivotally connected to the rear frame structure 2' by a pintle rod 12, which rod is mounted in a bracket 13 that is secured to said strut and passes through the draft bar. The front strut 2 of the frame has secured thereto a looped guide strap 13 adapted to prevent side play of the draft bar by permitting the same to rise and fall due to unevenness in the soil. The front end of the draft bar 11 is provided with a drive shackle 14 for conveniently attaching the same to a tractor or other power driven vehicle, and when it is desired to utilize the implements as an animal drawn machine, the front end of the draft bar has fitted thereto a tongue 15, which tongue is secured in position with relation to the draft bar by bolts 16. Thus, it will be seen that the tongue can be readily attached or removed. When the device is utilized as an animal drawn implement the draft whipple tree assemblage, indicated at A in dotted lines, is preferably attached to the front frame strut 2, through the medium of a standard hook and eye connection B. Owing to this arrangement, the implement as a whole, when animal drawn, is capable of floating to thus eliminate undue pressure upon the necks of the animals which would result in the event that the tongue was rigidly attached to the pulverizer.

As indicated in Figures 1 and 2 of the drawings, the parallel disc struts have secured thereto upstanding legs 16 for the support of a transverse trough 17, which trough serves as a receptacle for stones or other convenient weights, whereby the machine can be selectively loaded to conform to the condition of the soil. It is also manifest that this trough and its connections to the frame serve also to render the frame more rigid. The rear strut 2' of the frame is provided with the usual driver's seat C.

While I have shown and described in minute detail one exemplification of my invention, it is understood that I may vary the structural features of it within the scope of the appending claims.

I claim:

1. A combination land pulverizer and packer comprising a rectangular knock-down frame, a pair of transverse shafts carried thereby, alternately disposed gangs of conical discs mounted upon the shafts, the discs being provided with flat ground engaging surfaces, the prevalent faces of the discs being formed with flat ground engaging surfaces.

2. A combination land pulverizing and packer comprising a rectangular open frame including substantially V-shaped side supporting members, each embodying a horizontally disposed central portion and inclined side portions, front and rear cross beams removably secured to the ends of the side members, a pair of shafts rotatably carried by the horizontal portions of the side members, a plurality of discs connected with the shafts for rotation therewith, the front and rear cross beams being located a material distance front and rear of said discs, a supporting bearing bracket secured to the upper face of the rear cross beam, a pull tongue rockably connected to the bracket and extending forwardly across the frame and over the discs and a guide bracket carried by the front cross beam receiving the tongue.

In testimony that I claim the foregoing I have hereunto set my hand at Racine, in the county of Racine and State of Wisconsin.

JULIUS A. GAUSCHE.